(12) United States Patent
Ghosh et al.

(10) Patent No.: US 11,570,143 B2
(45) Date of Patent: Jan. 31, 2023

(54) IDENTIFYING NETWORK ADDRESSES CONTACTED BY APPLICATIONS WITHOUT PLATFORM DOMAIN NAME RESOLUTION

(71) Applicant: Apple Inc., Cupertino, CA (US)

(72) Inventors: Amitabha Ghosh, Sunnyvale, CA (US); Franco Travostino, San Jose, CA (US); Henri S. Berger, Los Altos, CA (US); Philip W. Flack, Gallatin, TN (US); Timothy A. Mccoy, Los Altos, CA (US); Maciej Stachowiak, San Francisco, CA (US); Beth M. Dakin, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/667,521

(22) Filed: Feb. 8, 2022

(65) Prior Publication Data

US 2022/0385622 A1 Dec. 1, 2022

Related U.S. Application Data

(60) Provisional application No. 63/195,667, filed on Jun. 1, 2021.

(51) Int. Cl.
*G06F 15/16* (2006.01)
*H04L 61/4511* (2022.01)
*H04L 61/103* (2022.01)

(52) U.S. Cl.
CPC ........ *H04L 61/4511* (2022.05); *H04L 61/103* (2013.01)

(58) Field of Classification Search
CPC ... H04L 61/4511; H04L 61/103; H04L 67/535
(Continued)

(56) References Cited

U.S. PATENT DOCUMENTS 7,924,832 B2 * 4/2011 Li .................. H04W 8/26
709/245
8,326,920 B1 * 12/2012 Modadugu .......... H04L 61/4511
709/227

(Continued)

OTHER PUBLICATIONS

Clover, "Apple Confirms Commitment to App Tracking Transparency in Letter Condemning Facebook's Data Collection," retrieved from https://www.macrumors.com/2020/11/19/apple-app-tracking-transparency-letter/, Nov. 19, 2020.

(Continued)

*Primary Examiner* — Ruolei Zong
(74) *Attorney, Agent, or Firm* — BakerHostetler

(57) ABSTRACT

A device implementing the subject system may include at least one processor configured to receive, by a first system process, a first network address that corresponds to a domain name that was resolved by a second system process, the resolving having been responsive to a resolution request therefor by an application process. The at least one processor may be further configured to receive, by the first system process, a second network address for which a network connection was opened by the application process. The at least one processor may be further configured to, responsive to determining that the application process opened a network connection for a network address for which the application process did not provide, to the second system process, a resolution request for the corresponding domain name, provide, by the first system process, an indication of the network address in conjunction with an indication of the application process.

20 Claims, 5 Drawing Sheets

(58) Field of Classification Search
USPC .......................................................... 709/245
See application file for complete search history.

(56) References Cited

U.S. PATENT DOCUMENTS

| | | | | |
|---|---|---|---|---|
| 2008/0229025 | A1* | 9/2008 | Plamondon | H04L 67/56 709/218 |
| 2010/0118869 | A1* | 5/2010 | Li | H04L 69/167 370/389 |
| 2011/0302322 | A1* | 12/2011 | Raciborski | H04L 61/4541 709/245 |
| 2019/0334946 | A1* | 10/2019 | Akcin | G06F 16/9566 |

OTHER PUBLICATIONS

Ha, et al., "Apple's App Tracking Transparency feature will be enabled by default and arrive in 'early spring' on iOS," retrieved from https://techcrunch.com/2021/01/27/apple-app-tracking-transparency/, Jan. 27, 2021.

\* cited by examiner

IDENTIFYING NETWORK ADDRESSES CONTACTED BY APPLICATIONS WITHOUT PLATFORM DOMAIN NAME RESOLUTION

CROSS REFERENCE TO RELATED APPLICATIONS

This application claims the benefit of priority to U.S. Provisional Patent Application No. 63/195,667, entitled "Identifying Network Addresses Contacted by Applications Without Platform Domain Name Resolution," filed on Jun. 1, 2021, the disclosure of which is hereby incorporated herein in its entirety.

TECHNICAL FIELD

The present description relates generally to identifying network addresses contacted by applications, including identifying network addresses contacted by applications without using platform (e.g., local) domain name resolution service.

BACKGROUND

Applications on a user's electronic device may contact one or more different network endpoints, e.g., servers. Some of the network endpoints may be contacted for the purpose of performing the intended use of the application, e.g., contacting a content server to obtain content to present to the user. However, other of the network endpoints may be contacted for purposes outside of the intended use of the application, e.g., activity tracking servers that may facilitate tracking the activity of the user.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
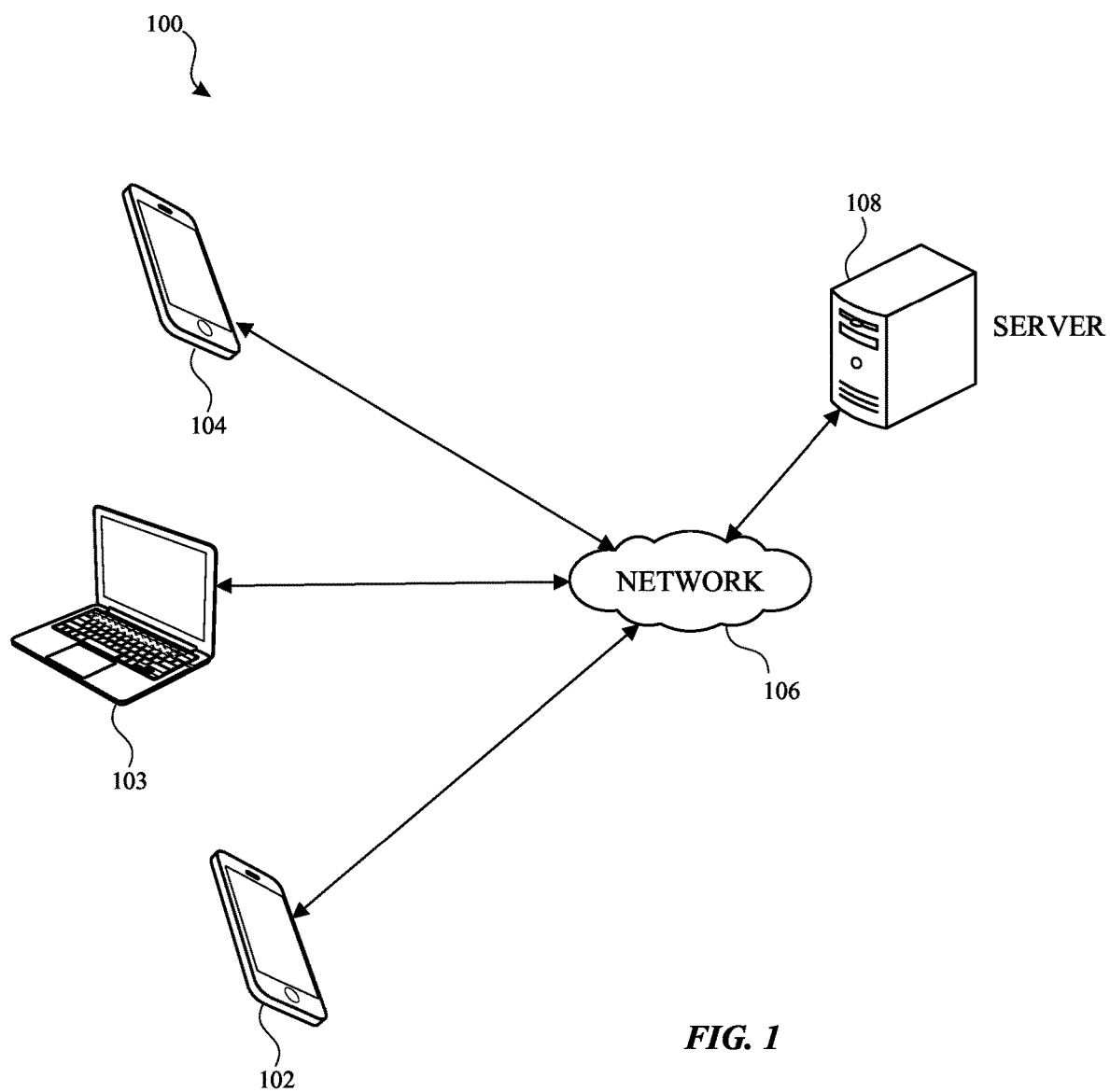
FIG. 1 illustrates an example network environment for identifying network addresses contacted by applications without platform domain name resolution in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Applications executing on user devices may contact and/or communicate with multiple different network endpoints, e.g., servers, for multiple different reasons. For example, an application may contact one or more servers to obtain content to provide to a user, or an application may contact one or more servers to facilitate tracking the activity of the user. A user may implicitly expect (and/or be aware) that an application will contact one or more servers to obtain content; however, a user may not expect (and/or be aware) that an application will contact one or more servers to facilitate tracking the activity of the user.

An operating system executing on the user's device may provide a platform domain name resolution service (e.g., as a system and/or operating system-level process) that may resolve domain names (and/or hostnames) on behalf of applications executing on the user's device. For example, an application executing on the user's device may use the platform domain name resolution service to resolve domain names (e.g., to obtain the corresponding network addresses) for network endpoints that the application intends to contact and/or communicate with. The operating system may then correlate the resolved domain names to domain names of known activity tracking network endpoints and/or servers, and can, for example, inform the user when an application is contacting activity tracking servers.

However, if an application does not utilize the platform domain name resolution service provided by the operating system, the operating system may not have visibility into the domain names being contacted by the application (e.g., the operating system may only have visibility into the network addresses contacted by the application). In this instance, the application may contact and/or communicate with one or more network addresses without the operating system (and consequently the user) having any visibility into the domain names of the network endpoints and/or servers being contacted and/or communicated with by the application.

In the subject system, a system level and/or operating system level process on the user's device may correlate the network addresses that were obtained by an application from the platform domain name resolution service with all of the network addresses that were contacted by the application. If the system level process determines that an application contacted one or more network addresses that the application did not obtain from the platform domain name resolution service, the system level process may perform one or more actions, such as notifying the user that the application has contacted one or more network addresses for which the corresponding domain name is unknown (and consequently for which the intent for contacting is unknown). In one or more implementations, an application may be able to declare that a particular contacted network address (e.g., for which the application did not utilize the platform domain name resolution service) corresponds to an activity tracking network endpoint and/or server, in which case the particular network address may be excluded from being characterized as an unknown network address.

In this manner, the subject system allows an operating system on the user's device to not only determine when an application has contacted one or more network addresses corresponding to one or more known activity tracking network endpoints and/or servers but also when an application has contacted one or more network addresses corresponding to one or more network endpoints for which the domain names (and consequently the reason for contacting) are not known.

FIG. 1 illustrates an example network environment 100 for identifying network addresses contacted by applications without platform domain name resolution in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102, 103, and 104, a network 106 and a server 108. The network 106 may communicatively (directly or indirectly) couple, for example, any two or more of the electronic devices 102-104 and/or the server 108. In one or more implementations, the network 106 may be an interconnected network of devices that may include, and/or may be communicatively coupled to, the Internet. For explanatory purposes, the network environment 100 is illustrated in FIG. 1 as including electronic devices 102-104 and a single server 108; however, the network environment 100 may include any number of electronic devices and any number of servers.

The server 108 may be, and/or may include all or part of, the electronic system discussed below with respect to FIG. 5. The server 108 may include one or more server devices and/or server instances, such as a cloud of servers. In one or more implementations, the server 108 may represent multiple different servers and/or network endpoints, that may be associated with multiple different service providers and/or entities, and that may be contacted by one or more applications executing on one or more of the electronic devices 102-104. For example, the server 108 may represent one or more activity tracking servers, application servers, domain name resolution service servers, content servers, and the like.

In one or more implementations, a user of an electronic device 102 may have an expectation that an application executing on the electronic device 102 may contact one or more particular servers in conjunction with the expected operation of the application, such as content servers, application servers and the like. However, the user may not have an expectation (or knowledge) that an application executing on the electronic device 102 may contact one or more other particular servers outside of the expected operation of the application, such as activity tracking servers. For explanatory purposes, a single server 108 is shown and discussed herein with respect to various operations. However, these and other operations discussed herein may be performed by one or more servers, and each different operation may be performed by the same or different servers.

One or more of the electronic devices 102-104 may be, for example, a portable computing device such as a laptop computer, a smartphone, a smart speaker, a peripheral device (e.g., a digital camera, headphones), a tablet device, a wearable device such as a smartwatch, a band, and the like, or any other appropriate device that includes, for example, one or more wireless interfaces, such as WLAN (e.g., Wi-Fi) radios, cellular radios, Bluetooth radios, Zigbee radios, near field communication (NFC) radios, and/or other wireless radios. In FIG. 1, by way of example, the electronic devices 102 and 104 are each depicted as a smartphone and the electronic device 103 is depicted as a laptop computer. Each of the electronic devices 102-104 may be, and/or may include all or part of, the device discussed below with respect to FIG. 2, and/or the electronic system discussed below with respect to FIG. 5.

In one or more implementations, one or more of the electronic devices 102-104 may be registered to, and/or associated with, a user account of a user, such as a user account with (and/or managed by) the server 108 (and/or another server) and/or an entity associated therewith. In one or more implementations, two or more of the electronic devices 102-104 may be registered to and/or associated with the same user account and/or different user accounts.

In the subject system, when applications executing on the electronic device 102 prepare to initiate a network connection with a server 108, the applications may utilize a platform domain name resolution (DNS) service (e.g., a system-level process executing on the electronic device 102) to resolve a hostname corresponding to the server 108, and to obtain the corresponding network address. The platform DNS service may then provide an indication of each network address that it resolved (and an indication of the application that requested the resolution) to a network address reconciliation service, which may also be a system level process executing on the electronic device 102.

The network address reconciliation service may also receive, from a kernel process or other system-level process executing on the electronic device 102, an indication of each network address that was contacted by each of the applications (e.g., each network address for which each of the applications initiated a network connection), along with an indication of the application that initiated the network connection. From the network addresses received from the platform DNS service, and the network addresses received from the kernel process, the network address reconciliation service may determine whether a given application contacted a network address for which the corresponding domain name was not resolved by the platform DNS service and may responsively perform one or more actions (such as notifying the user of the electronic device 102 that the application contacted such a network address).

In one or more implementations, when an application initiates a network connection to a network address for which the application did not resolve the corresponding domain name with the platform DNS service, the application may declare, using an application programming interface (API), e.g., to the kernel process, that the network address corresponds to an activity tracker network endpoint and/or server. In this instance, the kernel process may indicate to the network address reconciliation service that the network address corresponds to an activity tracker network endpoint and the network address reconciliation service may log the activity tracker network endpoint as having been contacted by the application.

An example architecture for identifying network addresses contacted by an application without utilizing platform domain name resolution is discussed further below with respect to FIG. 3, and an example process for identifying network addresses contacted by an application without utilizing platform domain name resolution is discussed further below with respect to FIG. 4.

Figure 2:
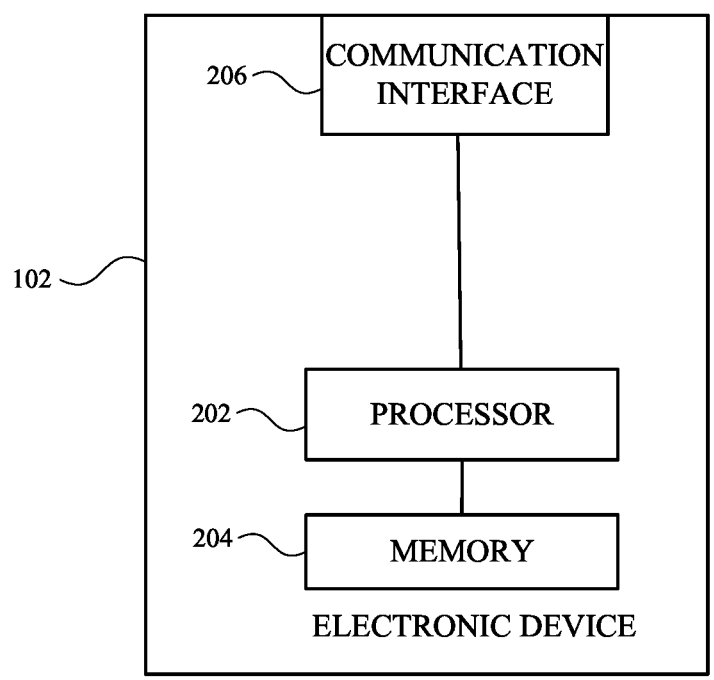
FIG. 2 illustrates an example device that may implement a system for identifying network addresses contacted by applications without platform domain name resolution in accordance with one or more implementations.

FIG. 2 illustrates an example electronic device 102 that may implement a system for identifying network addresses contacted by applications without platform domain name resolution in accordance with one or more implementations. For example, the electronic device 102 of FIG. 2 can correspond to any of the electronic devices 102-104, or to the server 108 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a processor 202, a memory 204, and a communication interface 206. The processor 202 may include suitable logic, circuitry, and/or code that enable processing data and/or controlling operations of the electronic device 102. In this regard, the processor 202 may be enabled to provide control signals to various other components of the electronic device 102. The processor 202 may also control transfers of data between various portions of the electronic device 102. Additionally, the processor 202 may enable implementation of an operating system or otherwise execute code to manage operations of the electronic device 102.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage. In one or more implementations, the memory 204 may store one or more network addresses that were contacted by one or more applications executing on the electronic device 102 without having requested a resolution of the corresponding domain name from a platform domain name resolution service. The one or more network addresses may be stored in the memory 204 in association with the corresponding application identifier and/or a user identifier of the user account that was active on the electronic device 102 when the network addresses were contacted.

The communication interface 206 may include suitable logic, circuitry, and/or code that enables wired or wireless communication, such as between any of the other electronic devices 103-104 and/or the server 108 over the network 106. The communication interface 206 may include, for example, one or more of a Bluetooth communication interface, a cellular communication interface (e.g., 3G, 4G, LTE, 5G, etc.), an NFC interface, a Zigbee communication interface, a WLAN communication interface (e.g., Wi-Fi, WLAN/BT combination, WiMAX, LiFi, 2.4 GHz, 5 GHz, etc.), a USB communication interface, an Ethernet communication interface, a millimeter wave (e.g., 60 GHz) communication interface, or generally any communication interface.

In one or more implementations, one or more of the processor 202, the memory 204, the communication interface 206, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
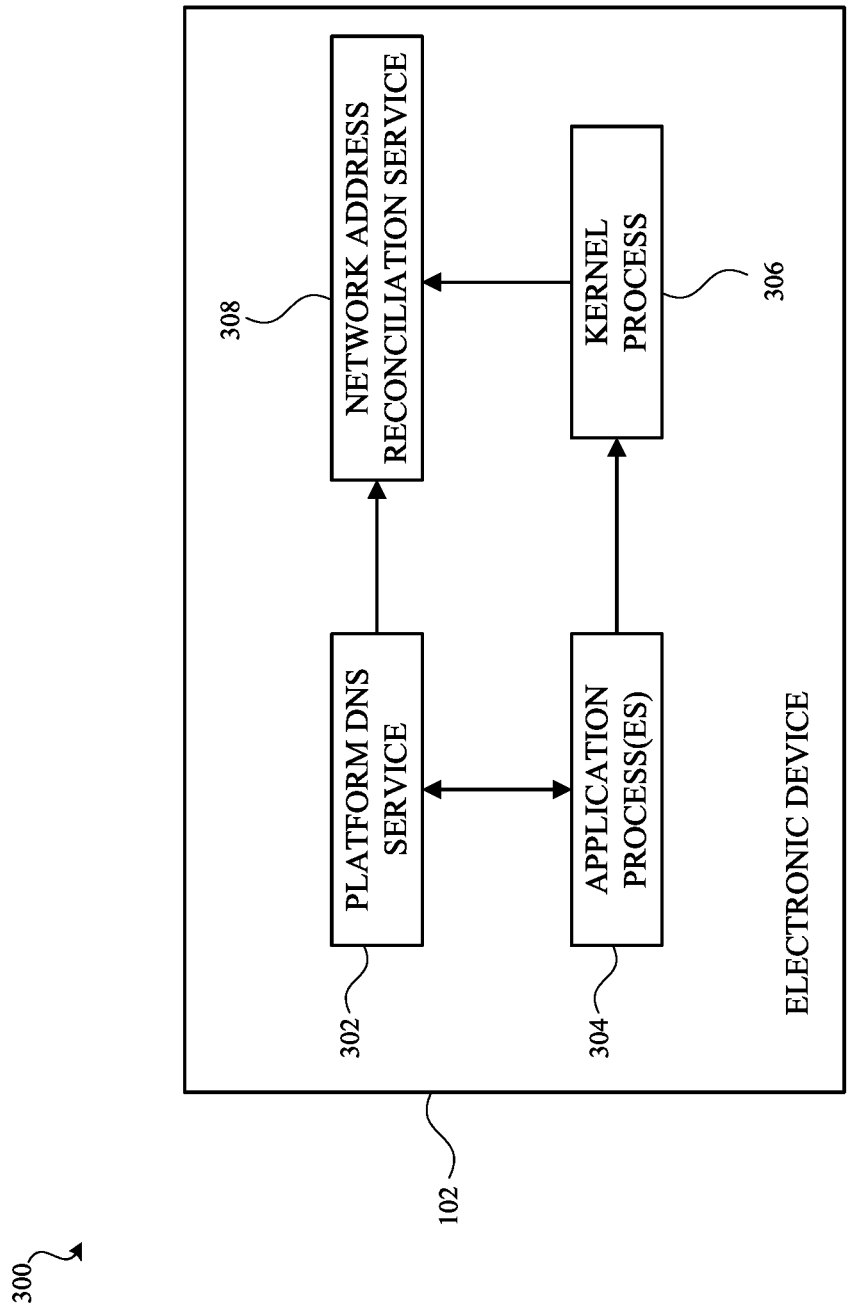
FIG. 3 illustrates an example architecture that may be implemented by an electronic device for identifying network addresses contacted by applications without platform domain name resolution in accordance with one or more implementations.

FIG. 3 illustrates an example architecture 300 that may be implemented by an electronic device 102 for identifying network addresses contacted by applications without platform domain name resolution in accordance with one or more implementations. For example, the electronic device 102 of FIG. 2 can correspond to any of the electronic devices 102-104, or to the server 108 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The architecture 300 may include a platform DNS service (and/or module) 302, one or more application processes 304, a network address reconciliation service (and/or module) 306, and one or more kernel processes 308. For explanatory purposes, the one or more application processes 304 may generally be referred to herein as a single application process 304; however, it will be understood that the application process 304 may represent any number of application processes corresponding to any number of different applications. Each of the platform DNS service 302, the one or more application processes 304, the network address reconciliation service 306, and the one or more kernel processes 308 may represent one or more processes executing on the electronic device 102, e.g., executing on the processor 202 of the electronic device 102.

When preparing to initiate a network connection to a server, an application process 304 may request resolution of a domain name corresponding to the server from the platform DNS service 302. For example, the application process 304 may transmit a domain name resolution request to the platform DNS service 302 that includes the domain name, and may receive, from the platform DNS service 302 and responsive to the request, a corresponding network address. The application process 304 may then open, via the kernel process 308, a network connection to the network addresses.

Thus, the platform DNS service 302 may receive domain name resolution requests from the application processes 304 and may respond with the network addresses corresponding to the domain names. In one or more implementations, the platform DNS service 302 may query a local database and/or one or more remote databases (e.g., at the server 108) to resolve any given domain name. The platform DNS service 302 may then provide, to the network address reconciliation service 306, an indication of the network addresses that were provided to the application processes 304 responsive to requests therefor, as well as an indication of the particular application process that requested resolution of each of the network addresses.

Similarly, the kernel process 308 may provide an indication of each network address for which an application process 304 opened a network connection, along with an indication of the application process 304 that opened the network connection, to the network address reconciliation service 306. For example, each time an application process 304 opens a network connection to a network address, such as through an API call, the call may pass through and/or notify the kernel process 308, and the kernel process 308 may store an indication of the network address and an identifier of the application process 304 opening the network connection.

In one or more implementations, when making an API call to open a network connection, the application process 304 may specify that the network connection corresponds to an activity tracker network endpoint and/or server. For example, the application process 304 may set a flag and/or parameter in the API call to specify that the network connection corresponds to an activity tracker network endpoint and/or server. In this instance, the kernel process 308 may provide an indication, to the network address reconciliation service 306, that the network address corresponds to an activity tracking network endpoint contacted by the application process 304.

Figure 4:
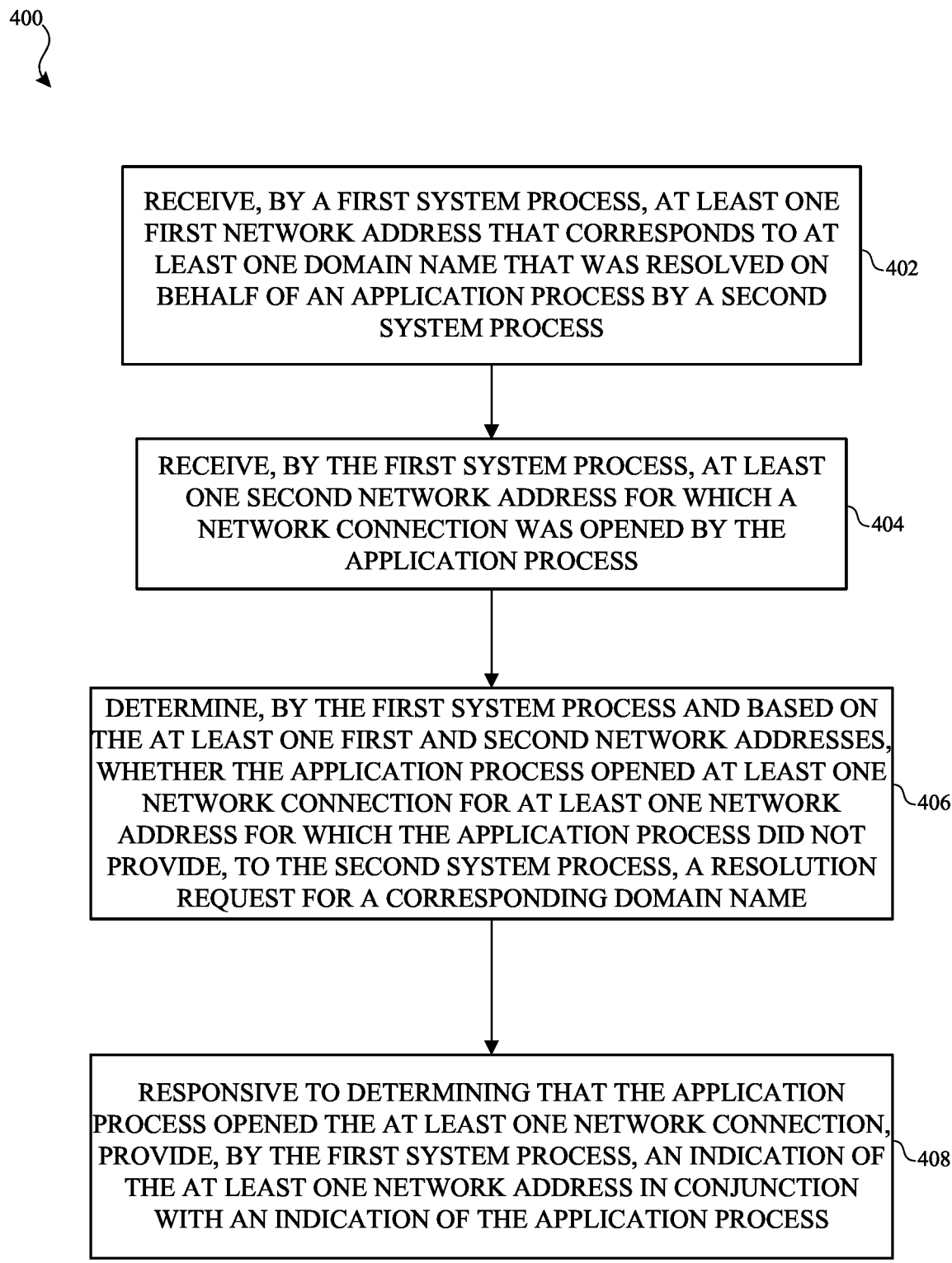
FIG. 4 illustrates a flow diagram of an example process of identifying network addresses contacted by applications without platform domain name resolution in accordance with one or more implementations.

FIG. 4 illustrates a flow diagram of an example process 400 of identifying network addresses contacted by applications without platform domain name resolution in accordance with one or more implementations. For explanatory purposes, the process 400 is primarily described herein with reference to the electronic device 102 of FIG. 1 and the architecture 300 of FIG. 3. However, the process 400 is not limited to the electronic device 102 of FIG. 1 or the architecture 300 of FIG. 3, and one or more blocks (or operations) of the process 400 may be performed by one or more other components of the server 108 and by other suitable devices (e.g., any of the electronic devices 102-104). Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

The process 400 may be initiated when a first system process executing on the electronic device 102 (e.g., the network address reconciliation service 306), receives at least one first network address that corresponds to at least one domain name that was resolved by a second system process executing on the electronic device (e.g., the platform DNS service 302), the resolving having been responsive to a resolution request therefor by an application process executing on the electronic device, such as the application process 304 (402).

For example, the platform DNS service 302 may periodically and/or aperiodically (and/or synchronously and/or asynchronously) transmit, to the network address reconciliation service 306, a list of network addresses for which the platform DNS service 302 resolved the corresponding domain names, along with an indication of each application process that requested resolution of each corresponding domain name. In one or more implementations, the platform DNS service 302 may transmit an indication of the network address and an indication of the corresponding application process each time the platform DNS service 302 resolves a domain name. In one or more implementations, the platform DNS service 302 may also provide an indication (e.g., identifier) of the active user account (e.g., logged in user account and/or registered user account) on the electronic device 102 when the request was made to the network address reconciliation service 306, e.g., in conjunction with the indication of the network address and the application process.

The first system process (e.g., the network address reconciliation service 306) may also receive, from a third system process (e.g., the kernel process 308), at least one second network address for which a network connection was opened by the application process 304 executing on the electronic device (404). For example, the kernel process 308 may provide an indication of each network address opened by each of the application processes 304 along with an indication (e.g., identifier) of the application process, and/or an indication (e.g., identifier) of the active user account on the electronic device 102. The kernel process 308 may provide a list of network addresses and corresponding application and/or user account identifiers periodically and/or aperiodically (and/or synchronously and/or asynchronously).

In one or more implementations, the kernel process 308 may provide the network addresses and/or identifiers responsive to a triggering event, such as a status change in one or more network connections opened by a given application process (e.g., the network connections being opened and/or closed), a change in state in the application process (e.g., the application and/or application process moves to the background and/or closes), and/or generally any other triggering event. In one or more implementations the second network addresses may be received by the network address reconciliation service 306 synchronously and/or asynchronously from receiving the first network addresses.

In one or more implementations, for any network addresses for which an application process indicated that the network address corresponds to an activity tracking network endpoint and/or server, such as at the time that the application process opened the corresponding network connection, the kernel process 308 may provide an indication of the same to the network address reconciliation service 306. In one or more implementations, the network address reconciliation service 306 may store the first and second network addresses (along with the corresponding application and/or user identifiers) in persistent memory, such as the memory 204.

The first system process (e.g., the network address reconciliation service 306) may then determine, based on the at least one first and second network addresses, whether a given application process 304 opened at least one network connection for at least one network address for which the application process 304 did not provide, to the second system process (e.g., the platform DNS resolution service 302), a resolution request for a corresponding domain name. For example, the network address reconciliation service 306 may periodically and/or aperiodically reconcile the set of resolved network addresses received from the platform DNS service 302 with the set of all network addresses received from the kernel process 308 (e.g., on a per application process basis for the currently logged in user), to determine whether any applications opened a network connection to a network address for which the application did not request, from the platform DNS service 302, a resolution of a corresponding domain name.

In one or more implementations, the network address reconciliation service 306 may perform the reconciling on a periodic and/or aperiodic basis for each given application process (and/or on a per user basis), such as responsive to one or more triggering events, such as a status change in one or more network connections opened by a given application process (e.g., the network connections being opened and/or closed), a change in state in the application process (e.g., the corresponding application and/or application process moves to the background and/or closes), and/or generally any other triggering event.

Responsive to determining that a given application process 304 opened the at least one network connection for at least one network address for which the application process 304 did not provide, to the second system process (e.g., the platform DNS resolution service 302), a resolution request for a corresponding domain name, the first system process (e.g., the network address reconciliation service 306) may perform an action, such as, for example, providing, an indication of the at least one network address in conjunction with an indication of the application process (408).

In one or more implementations, the network address reconciliation service 306 may store the at least one network address in persistent memory in association with the application identifier and/or user identifier, such as for subsequent retrieval and/or display to a user. In one or more implementations, the network address reconciliation service 306 may display, and/or may provide to another process for display, the network address and an indication of the corresponding application and/or user identifier to a user. In one or more implementations, the network address reconciliation service 306 may display, and/or may provide to another process for display, to the user a number (e.g., a count) of the network addresses that were contacted by each application without requesting, to the platform DNS resolution service 302, a resolution of a corresponding domain name and/or without providing an indication that the network address corresponds to an activity tracker network endpoint and/or server.

For example, the network address reconciliation service 306 may maintain a database and/or data structure (e.g., in the memory 204) that stores each such network address and the associated application and/or user identifier. In one or more implementations, the information stored by the network address reconciliation service 306 may have an expiration time, such as, for example, 7 days, after which the information may be deleted, and/or the information may be deleted responsive to a user request. In one or more implementations, the network address reconciliation service 306 may also store one or more timestamps in association with the network addresses and/or application identifiers, such as timestamps that correspond to an opening and/or closing of the corresponding network connections.

As described above, one aspect of the present technology is the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, social media identifiers and/or twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. Uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information, or publicly available information.

Figure 5:
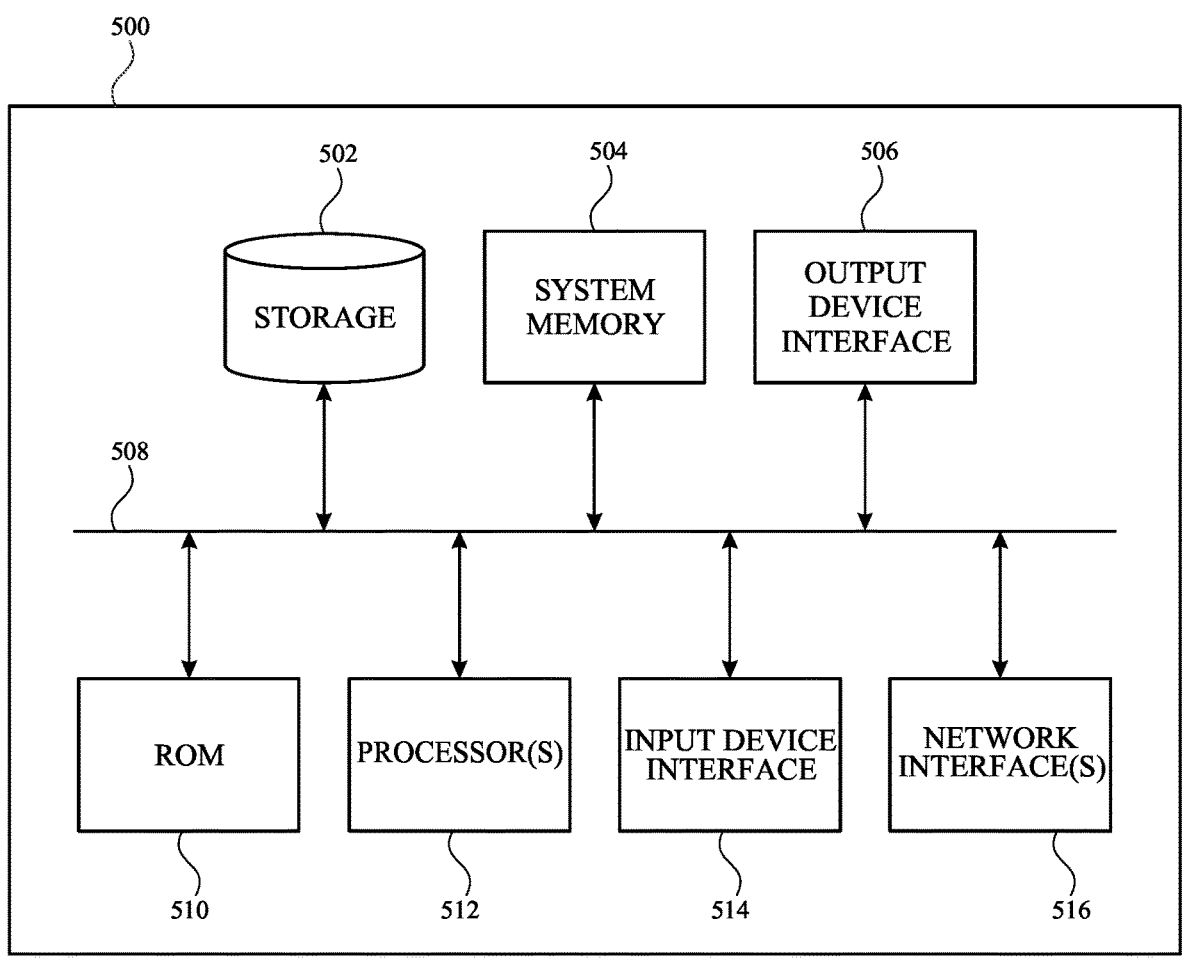
FIG. 5 illustrates an example electronic system with which aspects of the subject technology may be implemented in accordance with one or more implementations.

FIG. 5 illustrates an electronic system 500 with which one or more implementations of the subject technology may be implemented. The electronic system 500 can be, and/or can be a part of, one or more of the electronic devices 102-104, and/or one or the server 108 shown in FIG. 1. The electronic system 500 may include various types of computer readable media and interfaces for various other types of computer readable media. The electronic system 500 includes a bus 508, one or more processing unit(s) 512, a system memory 504 (and/or buffer), a ROM 510, a permanent storage device 502, an input device interface 514, an output device interface 506, and one or more network interfaces 516, or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations.

The ROM 510 stores static data and instructions that are needed by the one or more processing unit(s) 512 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory. The system memory 504 may store any of the instructions and data that one or more processing unit(s) 512 may need at runtime. In one or more implementations, the processes of the subject disclosure are stored in the system memory 504, the permanent storage device 502, and/or the ROM 510. From these various memory units, the one or more processing unit(s) 512 retrieves instructions to execute and data to process in order to execute the processes of one or more implementations.

The bus 508 also connects to the input and output device interfaces 514 and 506. The input device interface 514 enables a user to communicate information and select commands to the electronic system 500. Input devices that may be used with the input device interface 514 may include, for example, alphanumeric keyboards and pointing devices (also called "cursor control devices"). The output device interface 506 may enable, for example, the display of images generated by electronic system 500. Output devices that may be used with the output device interface 506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, the bus 508 also couples the electronic system 500 to one or more networks and/or to one or more network nodes, such as the server 108 shown in FIG. 1, through the one or more network interface(s) 516. In this manner, the electronic system 500 can be a part of a network of computers (such as a LAN), a wide area network ("WAN"), or an Intranet, or a network of networks, such as the Internet. Any or all components of the electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
receiving, by a first system process executing on an electronic device, at least one first network address that corresponds to at least one domain name that was resolved by a second system process executing on the electronic device, the resolving having been responsive to a resolution request therefor by an application process executing on the electronic device;
receiving, by the first system process, at least one second network address for which a network connection was opened by the application process executing on the electronic device;
determining, by the first system process and based on the at least one first and second network addresses, whether the application process opened at least one network connection for at least one network address for which the application process did not provide, to the second system process, a resolution request for a corresponding domain name; and
responsive to determining that the application process opened the at least one network connection for the at least one network address for which the application process did not provide, to the second system process, the resolution request for the corresponding domain name, providing, by the first system process, an indication of the at least one network address in conjunction with an indication of the application process.

2. The method of claim 1, wherein each of the at least one first and second network addresses is received, by the first system process, with a respective application identifier corresponding to the application process.

3. The method of claim 2, wherein the at least one of the first and second network addresses are stored in association with the respective application identifier in persistent memory.

4. The method of claim 3, wherein providing, by the first system process, the indication of the at least one network address in conjunction with the indication of the application comprises providing, by the first system process, the at least one network address for storage in the persistent memory in association with the respective application identifier corresponding to the application process.

5. The method of claim 4, wherein the at least one network address is subsequently retrieved from persistent memory and provided for display to a user of the electronic device in conjunction with the indication of the application process.

6. The method of claim 2, wherein each of the at least one first and second network addresses is received, by the first system process, asynchronously, and are correlated based on the respective application identifiers.

7. The method of claim 1, wherein the determining is performed by the first system process responsive to receipt of another indication triggered by a status change in the at least one network connection.

8. The method of claim 7, wherein the status change corresponds to the at least one network connection being opened.

9. The method of claim 7, wherein the status change corresponds to the at least one network connection being closed.

10. The method of claim 7, wherein the first system process receives the at least one second network address and the other indication from a kernel process that is separate from the first and second system processes.

11. The method of claim 1, wherein the indication of the at least one network address comprises a count of a number of the at least one network address.

12. The method of claim 11, wherein the count is provided for display to a user of the electronic device in conjunction with an indication of the application process.

13. The method of claim 1, wherein the second system process comprises a domain name resolution process that receives domain name resolution requests from application processes executing on the electronic device and resolves the requests on behalf of application processes executing on the electronic device.

14. The method of claim 1, wherein determining, by the first system process and based on the at least one first and second network addresses, whether the application process opened at least one network connection for at least one network address for which the application process did not provide, to the second system process, the resolution request for the corresponding domain name comprises determining, by the first system process, that the at least one second network address is not included in the at least one first network address.

15. The method of claim 1, further comprising:
responsive to determining that the application process did not open a network connection for the at least one network address for which the application process did not provide, to the second system process, the resolution request for the corresponding domain name, foregoing, by the first system process the providing of the indication of the at least one network address in conjunction with the indication of the application process.

16. The method of claim 1, wherein the at least one second network address excludes another at least one network address that corresponds to a domain name for which the application process identified as corresponding to a tracker.

17. A non-transitory machine-readable medium comprising instructions that, when executed by one or more processors, causes the one or more processors to perform operations comprising:
receiving, by a first system process and from a second system process, first network addresses and associated first application identifiers, each respective first network address corresponding to a respective domain name resolution request received by the second system process from a respective application identified by each respective associated first application identifier;
receiving, by the first system process and from a third system process, second network addresses and associated second application identifiers, each respective second network address corresponding to a network connection opened by a respective application corresponding to each respective associated second application identifier;
determining, by the first system process and based at least in part on the first and second network addresses and associated first and second application identifiers, at least one network address for which a network connection was opened by an application without having requested resolution of a corresponding domain name; and
providing, by the first system process, an indication of the at least one network address in conjunction with an indication of the application.

18. The non-transitory machine-readable medium of claim 17, wherein the providing, by the first system process, the indication of the at least one network address in conjunction with the indication of the application further comprises storing, in persistent memory, the at least one network address in associated with the indication of the application.

19. The non-transitory machine-readable medium of claim 17, wherein the second system process comprises a domain name resolution process that receives domain name resolution requests from applications and resolves the requests on behalf of the applications.

20. A device comprising:
a memory; and
at least one processor configured to:
receive, by a first system process executing on the device, at least one first network address that corresponds to at least one domain name that was resolved by a second system process executing on the device, the resolving having been responsive to a resolution request therefor by an application process executing on the device;
receive, by the first system process, at least one second network address for which a network connection was opened by the application process executing on the device;
determine, by the first system process and based on the at least one first and second network addresses, whether the application process opened at least one network connection for at least one network address for which the application process did not provide, to the second system process, a resolution request for a corresponding domain name; and responsive to a determination that the application process opened the at least one network connection for at least one network address for which the application process did not provide, to the second system process, the resolution request for the corresponding domain name, store, by the first system process, the at least one network address in conjunction with an indication of the application process.

\* \* \* \* \*